June 11, 1957     G. L. HAZEN     2,795,313
MEANS FOR MOVING FEED FORWARD IN A RECIPROCATING FEED TROUGH
Filed Feb. 8, 1954     2 Sheets-Sheet 1
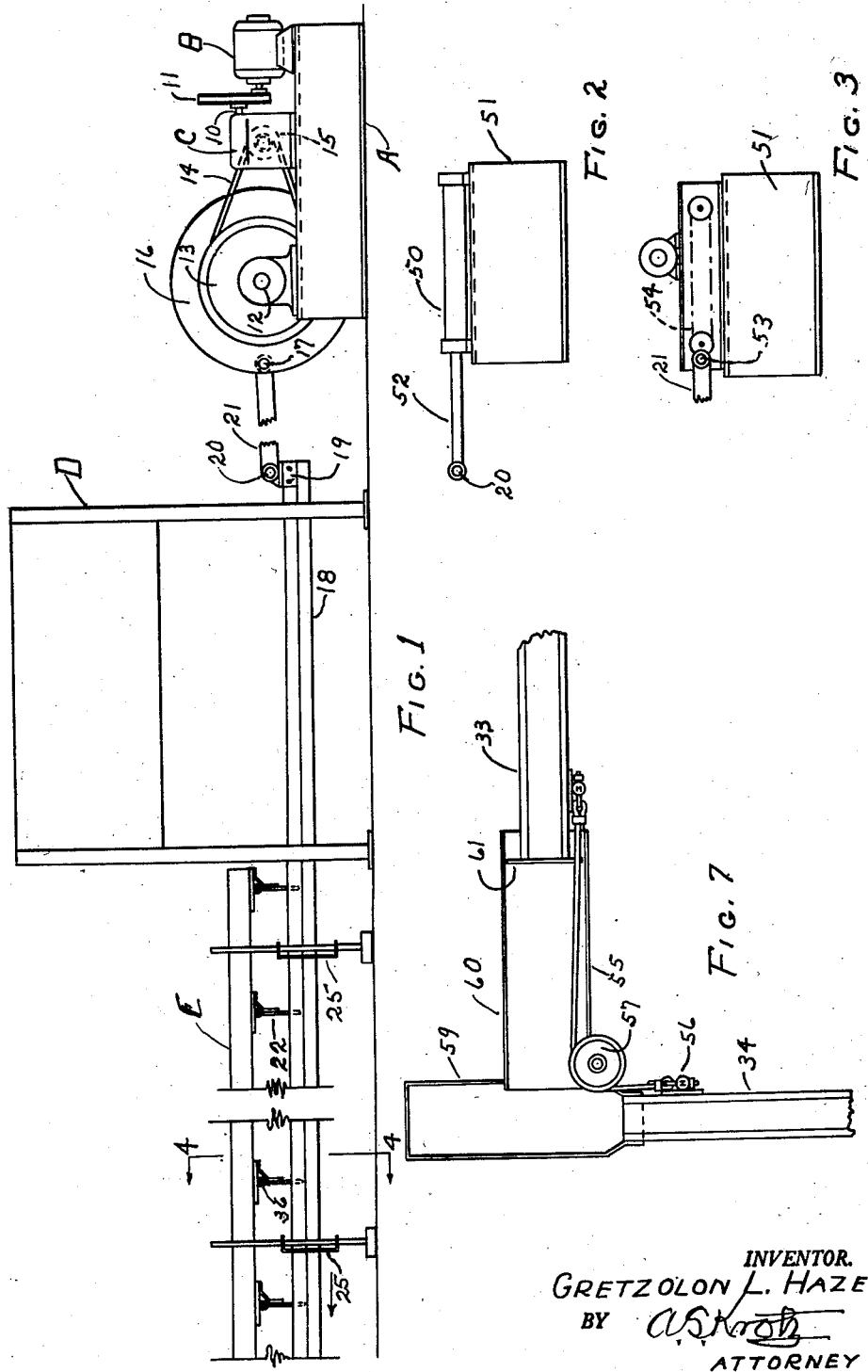
INVENTOR.
GRETZOLON L. HAZEN
BY
ATTORNEY June 11, 1957 G. L. HAZEN 2,795,313
MEANS FOR MOVING FEED FORWARD IN A RECIPROCATING FEED TROUGH
Filed Feb. 8, 1954 2 Sheets-Sheet 2
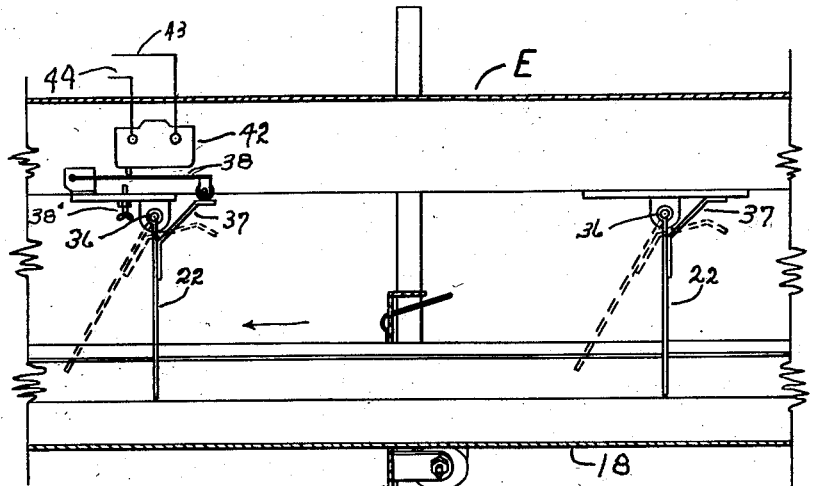
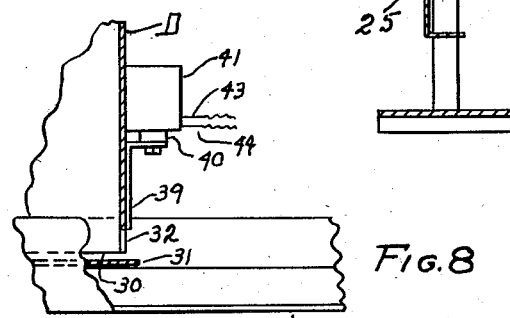
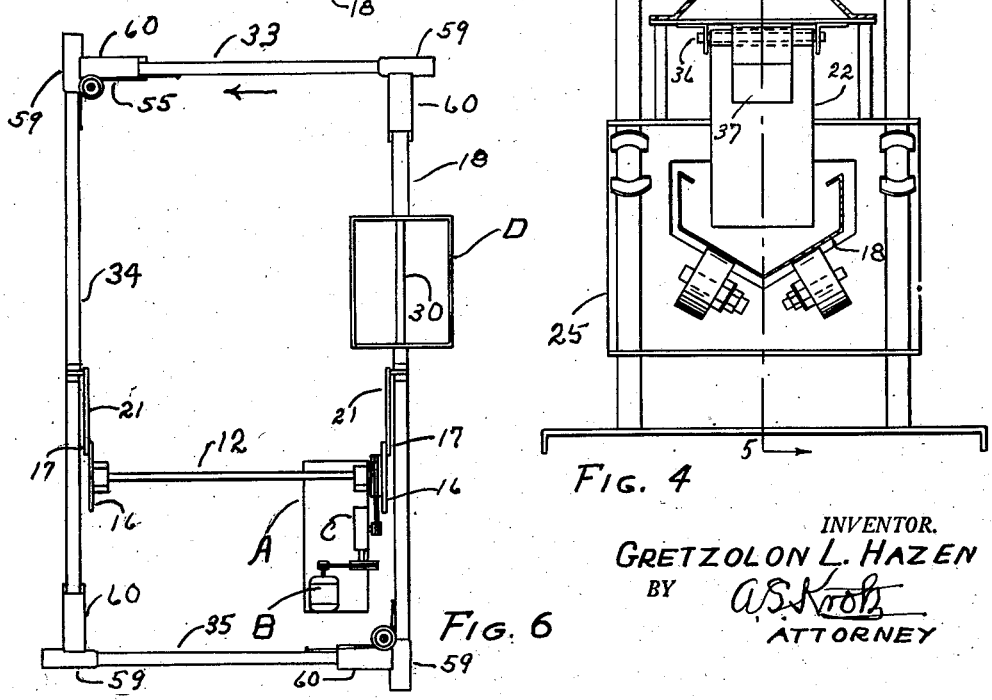
INVENTOR.
GRETZOLON L. HAZEN
BY
ATTORNEY

United States Patent Office 2,795,313
Patented June 11, 1957

2,795,313

MEANS FOR MOVING FEED FORWARD IN A RECIPROCATING FEED TROUGH

Gretzolon L. Hazen, Fort Atkinson, Wis., assignor to James Mfg. Co., Fort Atkinson, Wis., a corporation of Wisconsin Application February 8, 1954, Serial No. 408,739

2 Claims. (Cl. 198—60)

Objects of the present invention are to more efficiently serve a flock of growing birds or laying hens by means of a low first cost equipment which results in low upkeep.

Novel features of the present invention are the means provided for moving the feed from the hopper into a trough and for maintaining a desired depth of feed for the length of the trough or troughs.

To these and other useful ends my invention consists of parts, combinations of parts or their equivalents and mode of operation as hereinafter described and claimed and shown in the accompanying drawings in which:

Fig. 1 is a side view of a fraction of my invention showing the power unit.

Fig. 2 illustrates a modification of the power unit.

Fig. 3 illustrates another modification of the power unit.

Fig. 4 is an enlarged end section of a trough taken on line 4—4 of Figure 1.

Fig. 5 is an enlarged fractional view of a short part taken on line 5—5 of Figure 4, the means for oscillatingly supporting the trough and for supporting the stationary roof over the trough and also illustrating the means for moving the feed in the trough in direction indicated by arrow and for controlling a micro-switch used for a purpose which will hereinafter appear.

Fig. 6 is a diagrammatic view illustrating a circuit of four troughs with means for oscillating each trough and a feed hopper positioned over the first of the four troughs.

Fig. 7 is a top view of two troughs illustrating the means for transferring the oscillating movement from one trough to the other and for moving the feed from one trough to the other.

Fig. 8 illustrates a fraction of the hopper and means for controlling the flow of feed from the hopper to the first trough.

As thus illustrated the power unit illustrated in Figure 1 is designated in its entirety by reference character A and comprises a motor B and a transmission C. A transmission driving shaft 10 is operated by motor B by means of two V-belt pulleys and a V-belt 11. A shaft 12 is rotatably mounted on the base of member A, having a relatively large V-belt pulley 13 which is driven by a V-belt 14 by means of a V-belt transmission pulley 15.

A means 16 having a crank pin 17 is secured to shaft 12 and the first feed trough 18 has mounted thereon a bracket 19 having a connecting rod pin 20 with an operating connection to crank pin 17 by means of a connecting rod 21. Thus number one feed trough 18 is oscillated slowly by motor B a distance somewhat greater than the distance between plates or paddles 22 as will hereinafter appear.

The first feed trough 18 is oscillatingly supported by spaced brackets 25 preferably similar to the brackets shown in co-pending application #304,118, filed August 13, 1952, now Patent No. 2,742,138, granted April 17, 1956.

In Figure 1, I illustrate a hopper D in its entirety. This hopper is also illustrated in Figure 6 and fractionally in Figure 8. This hopper is preferably provided with a narrow outlet opening 30 (see Figures 6 and 8) for the length of the hopper and positioned relative to trough 18 as illustrated in my co-pending application Serial #311,489, filed September 25, 1952, now Patent No. 2,745,539, granted May 15, 1956, the trough having a supplemental bottom 31 which practically closes outlet 30 for its length and for the length of the stroke of the trough. The delivery end of hopper D is provided with an outlet opening 32 which is opened and closed preferably on the on and off principle as will hereinafter appear.

I will now describe my novel means for moving the feed forward in trough 18 and for moving the feed forward in troughs 33, 34 and 35 (see Figure 6).

Referring now especially to Figures 1, 4 and 5: a roof or cover E is positioned over each trough and supported in spaced relation on brackets 25 as illustrated in Figures 1 and 4; thus when the troughs are raised or lowered roofs E are correspondingly raised or lowered.

Plates 22 are hingedly supported on roofs E in spaced relation as at 36, each plate having an arm 37 which limits its swing in one direction only, as shown in Figure 5.

One of the plates 22 is used for controlling the gate valve 39 (see Figure 8). This valve is shown in an open position and is held in this position by a core 40 of solenoid 41 (when energized), the solenoid being operated by a micro-switch 42 through wires 43 and 44. Micro-switch 42 is adapted to be opened and closed by arm 37 so when the switch is opened by plate 22 at a time when it is riding over feed in the hopper which has reached a predetermined maximum height solenoid 41 will not be energized and valve 39 will then be permitted to close preferably by gravity and stop the flow of feed in trough 18. Thus the flow of feed will be controlled by the plate 22 associated with micro-switch 42, by means of a lever 38 and an adjusting screw 38', which provides means for regulating the time at which valve 39 will be closed or opened.

When the trough 18 is empty of feed, the paddle 22 adjacent switch 42 is gravity biased to vertical position to press arm 37 against switch actuator arm 38 to close switch 42, thereby energizing the solenoid 40 to hold gate 39 open. Reciprocation of trough 18 under these circumstances will not actuate paddle 22 adjacent switch 42 inasmuch as the lower margin of the paddle is spaced from the bottom of the trough. However, as soon as the level of feed in the trough rises, the feed will engage the paddle in the movement of the trough in the direction of the arrow shown in Fig. 5 to swing the paddle to the left and release pressure on actuator arm 38. This permits switch 42 to open, thus de-energizing the solenoid and dropping gate 39 across the outlet 32 of the hopper.

Movement of the trough in the direction of the arrow shown in Fig. 5 corresponds to movement of the trough toward the right in Fig. 8.

The supplemental or false bottom 31 in trough 18 (see Fig. 8) functions as a closure plate for the otherwise open bottom of the hopper. Closure plate 31 is longer than the longitudinal extent of the open bottom of the hopper. In its position shown in Fig. 8, closure plate 31 is substantially completely retracted and the trough is in substantially its extreme position toward the left in that view.

If gate 39 is open because the level of feed is below the lower margin of the paddle 22, feed will deposit by gravity through the outlet 32 onto the closure plate 31. As the closure plate moves with the trough toward the right, it will carry feed thus deposited with it as additional feed flows from the hopper onto the plate. When the trough moves in its opposite direction in which the closure plate 31 retracts beneath the hopper, feed thus deposited on the closure plate will be pushed off the plate and into the trough. This will occur whether or not the gate 39 is closed, either the closed gate or feed in the hopper acting as a wiper.

Accordingly, as long as the gate 39 is open when the trough is moving toward the right in Fig. 8, feed will be supplied from the hopper to the trough. As soon as such movement lifts the switch actuating paddle 22, however, gate 39 will close as aforesaid to close outlet 32 and preclude flow of feed from the hopper onto the closure plate.

Gate 39 will remain closed during a substantial portion of the retracting stroke of the trough. As soon as the switch actuating paddle 22 reaches a substantially vertical position, switch 42 will be again actuated to raise the gate. However, since the closure plate 31 is retracting beneath the hopper, no feed can flow from the hopper. On the next forward stroke of the hopper, paddle 22 will be pivoted to open switch 42 and close gate 39 to block flow of feed from the hopper. As soon as the feed level in the trough drops below the level of the lower margin of the paddle, gate 39 will remain open in the next forward stroke of the trough to cause discharge of feed from the hopper into the trough as aforesaid. As soon as the feed rises in the trough above the level of the lower margin of the paddle, the gate 39 will close in the forward stroke of the trough to preclude such discharge. I may elect to oscillate trough 18.

I may elect to oscillate the feed trough or troughs hydraulically as illustrated in Figure 2, wherein the cylinder is designated by reference character 50, the cylinder being mounted on a base 51 and the piston rod 52 being preferably in alignment with pin 20. Another method may be used wherein a connecting rod 21 is operated by a pin 53 connected to an endless chain 54 similar to the driving means shown in issued Patent No. 2,467,988, April 19, 1949. This device being mounted on a base 51 and connecting rod 21 being connected to connecting rod pin 20 as in Figure 1.

Referring now to Figures 6 and 7; a circuit of 4 troughs 18, 33, 34 and 35 are shown, each trough being adapted to receive feed from the delivery end of its preceding trough and may be oscillated thereby as follows:

A cable 55 at its ends is secured to anchors 56—56 and passes over a pulley 57. It will be noted by observing Figure 6 that trough 33 is driven by trough 34 and that trough 35 is driven by trough 18 when a complete circuit of four troughs is provided as shown in this figure.

In Figure 7, trough 34 has an extended portion 59. Stationary troughs 60 are positioned for delivering feed into extension troughs 59. For example trough 18 is adapted to move the feed into member 60 by gravity and has a push plate 61 for pushing the feed from member 60 into extension 59, from which the feed is then moved forward in the direction indicated by the arrow.

In Figure 6, I illustrate hopper D as being positioned over trough 18. Troughs 18 and 34 are oscillated by a power unit A through connecting rods 21—21. Trough 33 receives its oscillating motion from trough 34 and trough 35 receives its oscillating motion from trough 18, the connection between certain adjacent troughs being similar to that shown in Figure 7. Thus the feed will be moved around the circuit through the four troughs as already described in connection with Figures 1, 4, and 5.

Clearly many minor detail changes in the design as shown may be made without departing from the spirit and scope of my invention as recited in the appended claims.

Having thus shown and described my invention, I claim:

1. In a device of the character described, the combination with a feed trough and a feed hopper having an open bottom, said trough being provided with a closure plate for said bottom and movable with said trough therealong, said closure plate being longer than the longitudinal extent of the hopper opening whereby to close said bottom throughout reciprocatory movement of the trough, a gate for said outlet movable transversely of the direction of trough reciprocation to and from sliding engagement with the closure plate, feed in said hopper being discharged from said hopper through its outlet onto a portion of said plate extending beyond said hopper outlet, feed thus deposited on the closure plate being wiped from the plate when the closure plate is retracted beneath the hopper to fall into the trough, and electrical means including a switch for actuating said gate, said trough being provided with means including oscillation paddles to advance feed therein, supports from which said paddles depend into said trough, and means for producing relative longitudinal reciprocatory movement between the paddle supports and the trough, said paddles and supports being provided with cooperating means to limit the oscillation of said paddles in one direction of relative longitudinal reciprocatory movement between the paddle supports and trough whereby feed in the trough is advanced with respect to the trough, said switch being disposed adjacent one of said paddles and means adapted on movement of the paddle to actuate the switch whereby said hopper outlet gate is actuated in response to paddle action.

2. The device of claim 1 in which the lower margin of the paddle adjacent said switch is spaced from the trough bottom, said paddle being normally gravity biased in the absence of feed in the trough to close the switch to hold the hopper outlet gate open whereby feed will flow from the hopper into the trough, said paddle being subject to thrust of feed in the trough to swing it to a position in which the switch will open to close said gate when the feed has filled the trough above the level of the lower margin of the paddle.

References Cited in the file of this patent

UNITED STATES PATENTS

| | | |
|---|---|---|
| 379,704 | Krause et al. | Mar. 20, 1888 |
| 538,822 | Draver | May 7, 1895 |
| 2,043,595 | Raymond | June 9, 1936 |
| 2,111,663 | Graemiger | Mar. 22, 1938 |
| 2,681,132 | Knutson | June 15, 1954 |